United States Patent
Lei et al.

(10) Patent No.: US 10,803,246 B2
(45) Date of Patent: *Oct. 13, 2020

(54) DECOMPOSING COMPOSITE PRODUCT REVIEWS

(71) Applicant: International Business Machines Corporation, Armonk, NY (US)

(72) Inventors: Hui Lei, Scarsdale, NY (US); Ajay Mohindra, Yorktown Heights, NY (US); Rohit Ranchal, Cambridge, MA (US); Ravi Tejwani, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/275,524

(22) Filed: Feb. 14, 2019

(65) Prior Publication Data

US 2019/0188259 A1 Jun. 20, 2019

Related U.S. Application Data

(63) Continuation of application No. 15/237,725, filed on Aug. 16, 2016, now Pat. No. 10,268,677.

(51) Int. Cl.
*G06F 17/27* (2006.01)
*G06F 40/289* (2020.01)
(Continued)

(52) U.S. Cl.
CPC ............ *G06F 40/289* (2020.01); *G06F 40/30* (2020.01); *G06F 16/951* (2019.01);
(Continued)

(58) Field of Classification Search
None
See application file for complete search history.

(56) References Cited

U.S. PATENT DOCUMENTS 6,041,311 A ‡ 3/2000 Chislenko .............. G06Q 30/02
705/26
6,990,458 B2 * 1/2006 Harrison .......... G06Q 10/06311
705/7.14

(Continued)

OTHER PUBLICATIONS

P. Mell et al., "The NIST Definition of Cloud Computing", National Institute of Standards and Technology, Information Technology Laboratory, Sep. 2011, pp. 1-7.‡

(Continued)

*Primary Examiner* — Richard Z Zhu
(74) *Attorney, Agent, or Firm* — Law Office of Jim Boice

(57) ABSTRACT

A method, system, and/or computer program product for identifying and replacing a deficient component in a product. One or more processors deconstruct a text product review into multiple n-grams, where each of the multiple n-grams is a review of a particular component from components of a product. The processor(s) generate a component numeric rating value (CNRV) for each of the multiple n-grams, where the CNRV is based on an analysis of each of the multiple n-grams. The processor(s) identify a deficient component of the product. The processor(s) identify a cause of the deficiency in the deficient component and identify a replacement component that does not cause the deficiency in the deficient component. The processor(s) direct a manufacturing device that manufactures the product to replace the deficient component with the replacement component.

20 Claims, 6 Drawing Sheets

(51) Int. Cl.
*G06F 40/30* (2020.01)
*G06F 16/951* (2019.01)
*G06F 16/9535* (2019.01)
*G06F 40/284* (2020.01)
*G06F 40/279* (2020.01)
*G06F 40/40* (2020.01)
*G06F 40/205* (2020.01)

(52) U.S. Cl.
CPC ........ *G06F 16/9535* (2019.01); *G06F 40/205* (2020.01); *G06F 40/279* (2020.01); *G06F 40/284* (2020.01); *G06F 40/40* (2020.01)

(56) References Cited

U.S. PATENT DOCUMENTS

| | | | | |
|---|---|---|---|---|
| 8,117,207 | B2 ‡ | 2/2012 | Mushtaq | G06Q 30/0245 707/74 |
| 8,156,119 | B2 ‡ | 4/2012 | Hu | G06N 20/00 707/73 |
| 8,671,098 | B2 ‡ | 3/2014 | Salvetti | G06Q 30/0278 707/73 |
| 9,672,497 | B1 * | 6/2017 | Lewis | G06F 40/284 |
| 2006/0230071 | A1 * | 10/2006 | Kass | G06Q 10/00 |
| 2009/0299824 | A1 ‡ | 12/2009 | Barnes, Jr. | G06F 3/04847 705/7.39 |
| 2009/0319342 | A1 * | 12/2009 | Shilman | G06Q 10/06395 705/7.41 |
| 2011/0035326 | A1 ‡ | 2/2011 | Sholl | G06Q 30/018 705/317 |
| 2013/0268457 | A1 ‡ | 10/2013 | Wang | G06Q 30/0203 705/34 |
| 2014/0278738 | A1 ‡ | 9/2014 | Feit | G06Q 30/0201 705/7 |
| 2015/0088608 | A1 ‡ | 3/2015 | Cama | G06Q 30/00 705/7 |
| 2015/0095071 | A1 * | 4/2015 | Battcher | G06F 16/532 705/4 |
| 2016/0070709 | A1 ‡ | 3/2016 | Luan | G06Q 30/0282 707/72 |
| 2016/0117581 | A1 * | 4/2016 | Ortega | G06Q 10/20 235/375 |
| 2017/0242426 | A1 * | 8/2017 | Yasukawa | B62D 65/005 |
| 2017/0344638 | A1 ‡ | 11/2017 | Laperi | G06F 17/30014 |

OTHER PUBLICATIONS

Yang et al. "Feature-Based Product Review Summarization Utilizing User Score". Journal of Information Science and Engineering, vol. 26, No. 6, pp. 1973-1990.‡

Khan et al. "Identifying Product Features From Customer Reviews Using Lexical Concordance". Research Journal of Applied Sciences, Engineering and Technology, vol. 4, No. 7, pp. 833-839.‡

Ranchal et al. "Hierarchical Aggregation of Consumer Ratings for Service Ecosystem". 2015 IEEE International Conference on Web Services, DOI 10.1109/ICWS.2015.82, pp. 575-582.‡

Li et al. "A Subjective Probability Based Deductive Approach to Global Trust Evaluation in Composite Services". 2011 IEEE International Conference on Web Services, DOI 10.1109/ICWS.2011.28, pp. 604-611.‡

Nepal et al. "Reputation Propagation in Composite Services". 2009 IEEE International Conference on Web Services, DOI 10.1109/ICWS.2009.54, pp. 295-302.‡

Anonymous, "Amazon Customer Product Ratings". amazon.com, Web Jun. 20, 2016. <http://www.amazon.com/gp/help/customer/display.html?nodeId=537806>.‡

Anonymous, "IMBD Movie Ratings". imdb.com, Web. Jun. 20, 2016. <http://www.imdb.com/help/show_leaf?votestopfaq&pf_rd_m=A2FGELUUNOQJNL&pf_rd_p=2239792642&pf_rd_r=0TX1R9XH00C2A6JGY6TW&pf_rd_s=cente%E2%80%A6>.‡

Anonymous, "IBM Cloud Service Ratings". ibmcloud.com, Web. Aug. 15, 2016. <https://marketplace.ibmcloud.com/home>.‡

Anonymous, "Google App Ratings", google.com, We. Jun. 20, 2016. <https://chrome.google.com/webstore/category/apps>.‡

Anonymous, "IMDB Movie Ratings". imdb.com, Web. Jun. 20, 2016. <http://www.imdb.com/help/show_leaf?votestopfaq&pf_rd_m=A2FGELUUNOQJNL&pf_rd_p=2239792642&pf_rd_r=0TX1R9XH00C2A6JGY6TW&pf_rd_s=cente%E2%80%A6>.

U.S. Appl. No. 15/237,725—Non-Final Office Action dated Sep. 10, 2018.

List of IBM Patents or Patent Applications Treated as Related, Feb. 1, 2019.

* cited by examiner
‡ imported from a related application

200a

| RATING | REVIEW | CAMERA | DISPLAY | BATTERY |
|---|---|---|---|---|
| 5 | EXCELLENT CAMERA, NICE DISPLAY, GOOD BATTERY | 5 | 4 | 4 |
| 3 | THE CAMERA IS AWESOME BUT THE BATTERY IS BAD | 5 | – | 2 |
| 1 | CLUNKY TO USE | – | – | – |

202 →
204a →
206a →

| RATING | REVIEW | CAMERA | DISPLAY | BATTERY |
|---|---|---|---|---|
| 3 | GREAT CAMERA, GOOD DISPLAY, BAD BATTERY | 5 | 4 | 2 |

208 →

| RATING | REVIEW | CAMERA | DISPLAY | BATTERY |
|---|---|---|---|---|
| 1 | CLUNKY PHONE, OKAY CAMERA, POOR DISPLAY, WEAK BATTERY | 3 | 2 | 1 |

200b, 210 →

| RATING | REVIEW | CAMERA | DISPLAY | BATTERY |
|---|---|---|---|---|
| 5 | EXCELLENT CAMERA, NICE DISPLAY, GOOD BATTERY | 5 | 4 | 4 |
| 3 | THE CAMERA IS AWESOME BUT THE BATTERY IS BAD | 5 | 4 | 2 |
| 1 | CLUNKY TO USE | 3 | 2 | 1 |
| AGGREGATED SCORE | | 4.5 | 4 | 3 |

DECOMPOSING COMPOSITE PRODUCT REVIEWS

BACKGROUND

The present disclosure relates to the field of computers, and particularly to computers that handle product reviews. Still more particularly, the present invention relates to decomposing product reviews into quantified component values that are used to adjust an operational feature of a device.

SUMMARY

In one or more embodiments of the present invention, a method, system, and/or computer program product identify and replace a deficient component in a product. One or more processors deconstruct a text product review into multiple n-grams, where each of the multiple n-grams is a review of a particular component from components of a product. The processor(s) generate a component numeric rating value (CNRV) for each of the multiple n-grams, where the CNRV is based on an analysis of each of the multiple n-grams. The processor(s) identify a deficient component of the product, where the deficient component has a deficiency, where the deficiency is described in a deficient component n-gram from the text product review, and where the deficient component n-gram has a CNRV whose value is below a predetermined value. The processor(s) identify a cause of the deficiency in the deficient component and identify a replacement component that does not cause the deficiency in the deficient component. The processor(s) direct a manufacturing device that manufactures the product to replace the deficient component with the replacement component.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIG. 2 illustrates text product reviews that have been deconstructed into different components having quantified product component ratings;

DETAILED DESCRIPTION

Figure 1:
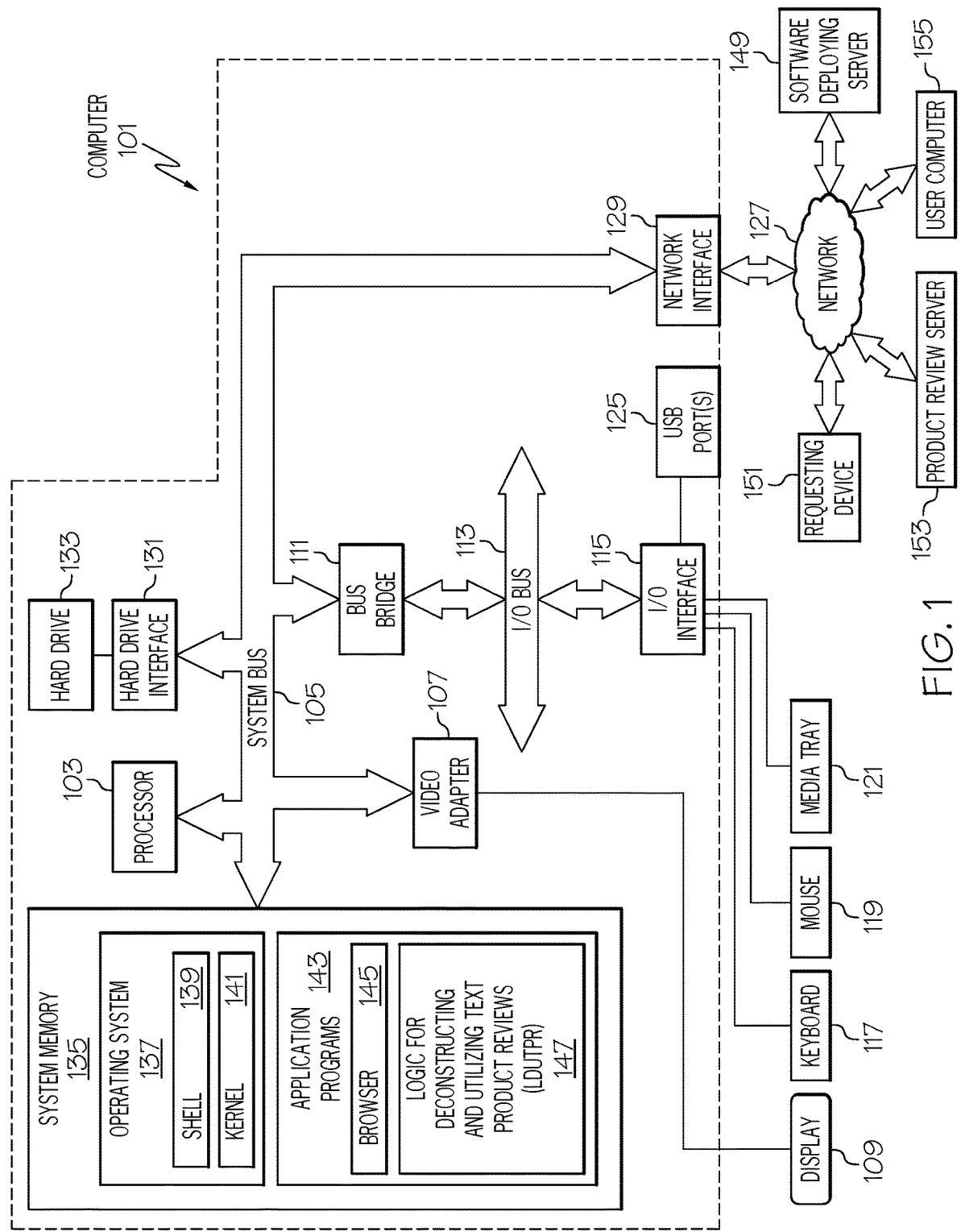
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 and/or requesting device 151 and/or product review server 153 and/or user computer 155 shown in FIG. 1.

Exemplary computer 101 includes a processor 103 that is coupled to a system bus 105. Processor 103 may utilize one or more processors, each of which has one or more processor cores. A video adapter 107, which drives/supports a display 109 (which in one or more embodiments of the present invention is a touch-screen display capable of detecting touch inputs onto the display 109), is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multi-media interfaces, etc.), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or other devices/systems (e.g., requesting device 151) using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include Logic for Deconstructing and Utilizing Text Product Reviews (LDUTPR) 147. LDUTPR 147 includes code for implementing the processes described below, including those described in FIGS. 2-4. In one embodiment, computer 101 is able to download LDUTPR 147 from software deploying server 149, including in an on-demand basis, wherein the code in LDUTPR 147 is not downloaded until needed for execution. In one embodiment of the present invention, software deploying server 149 performs all of the functions associated with the present invention (including execution of LDUTPR 147), thus freeing computer 101 from having to use its own internal computing resources to execute LDUTPR 147.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

Consumer Ratings are widely used to evaluate and identify the quality of various products. As used herein, the term "product" includes, but is not limited to services such as information technology (IT) solutions, Cloud services, software products such as mobile device apps and other software applications, downloads (e.g., music, movies, etc.), as well as physical (i.e., tangible) products such as machinery, computer hardware, vehicles, cameras, etc.

Product ratings may be collected and aggregated for atomic objects (i.e., individual products rather than a collection of products). However, in the prior art a user rating for an object also captures (implicitly) the quality of its various components (for composite objects) and features (for atomic objects). For instance, in the prior art a rating of 4 on a 5-star scale for an object is a representation of quality of all aspects of the object (i.e., the rating provides an overall rating for the object/product, not the individual components of the object/product).

The present invention identifies component quality of a product, which aids in detecting and troubleshooting the strong and weak points/components/features of the product.

One or more embodiments of the present invention evaluate the quality of components by decomposing the text reviews into quantified component ratings. This allows the system: to identify component/feature qualities of the product; to compare two or more composite objects at different component levels; and/or to identify "hot spots" (i.e., important and yet weak components in the product) in order to facilitate troubleshooting and/or product improvement.

With reference now to FIG. 2, consider the text product reviews depicted in chart 200*a*. As shown for exemplary purposes in FIG. 2, chart 200*a* includes three text reviews for a particular smart phone that has a built-in camera, a display, and a battery. While only three reviews are depicted, in one or more embodiments of the present invention hundreds, thousands, or even millions of reviews are evaluated in accordance with the process/method described herein.

As shown in chart 200*a*, review 202 states "excellent camera, nice display, good battery" about the smart phone, and gives it an overall rating of "5" for the smart phone. However, the overall rating initially does not give an individual rating for the camera, display, and battery. That is, when a potential buyer of the smart phone reads the rating, "5" does not provide any specific information about the camera, display, and battery in the smart phone. In order to get this review information, the reader must read the text review "excellent display, nice camera, good battery".

Thus, one or more embodiments of the present invention utilize natural language processing (NLP) to 1) determine the meaning of each section of the text review, and 2) assign a numeric rating for each section. That is, the text review shown in review 202 has three n-grams (strings of words): "excellent camera", "nice display", and "good battery". NLP will evaluate each of these three n-grams in order to determine whether the statements are positive or negative. Strong positive words such as "excellent" will result in a value of 5 (out of 5), while other positive words such as "nice" and "good" will result in the value of 4. Thus, the present invention has used NLP to deconstruct "excellent camera, nice display, good battery" into ratings of 5, 4, and 4 for the camera, display and battery in the phone, as shown in table 200*a*.

At times, a text review may fail to specifically review some or all of the components of the phone. For example, the text from review 204*a* addresses the camera ("awesome"—resulting in a rating of 5), and the battery ("bad"—resulting in a rating of 2), but fails to review the display. As shown in review 204*a*, the reviewer has given this phone an overall rating of 3. In order to fill in the blank in the numeric/component review for the display, the present invention locates another review 208 of the phone that 1) has an overall rating of 3; 2) has given the camera a component rating of 5, and 3) has given the battery a component rating of 2. That is, in order to fill in the missing info, one or more embodiments of the present invention use machine learning techniques (such as collaborative filtering) to identify all reviews that are closely related. The system then uses this information to impute the missing values into the review.

Assume now that, as shown in FIG. 2, this other review 208 has given the display on the phone a text review ("good display") that resulted in a rating of 4. Since the overall ratings for the current review 204*a* and the other review 208 are the same (3), and since the camera ratings from both reviews is a 5, and since the battery rating for both reviews is a 2, then the present invention will populate the rating for the battery in review 204*a* with a 4 as well, as shown in review 204*b* shown in table 200*b*. In one or more embodiments of the present invention, review 204*a* is aligned with the other review 208 in response to a predetermined quantity/percentage of the words in the text review matching between the two reviews, as described below for review 206*a* and review 210.

With regard now to review 206*a*, review 206*a* fails to review any of the components "camera, display, battery" of the phone. Rather, the text review only states "clunky to use". As with review 204*a* discussed above, the system will find another review 210 that has given the phone a rating of 1 and/or shares some words (e.g., "clunky") in the text review, in order to fill in all fields in the review 206*a*. That is, since review 206*a* and review 210 both gave the phone an overall rating of 1, and since review 206*a* and review 210 both used the word "clunky" in the their text reviews, then review 206*a* will adopt the ratings of 3, 2, and 1 respectively for the camera, display, and battery, as shown in review 206*b*.

In one or more embodiments of the present invention, once table 200*b* has been generated (with rating values for all fields), an aggregated score for each feature is generated, as shown in row 212 of table 200b. This aggregated score can be an average score (as depicted) or a summation (not depicted) of all rating values for the different components of the phone. If presented as an average score, the aggregated score can be calculated based on one or more statistical parameters, such as average, median, mode, etc.

Figure 3:
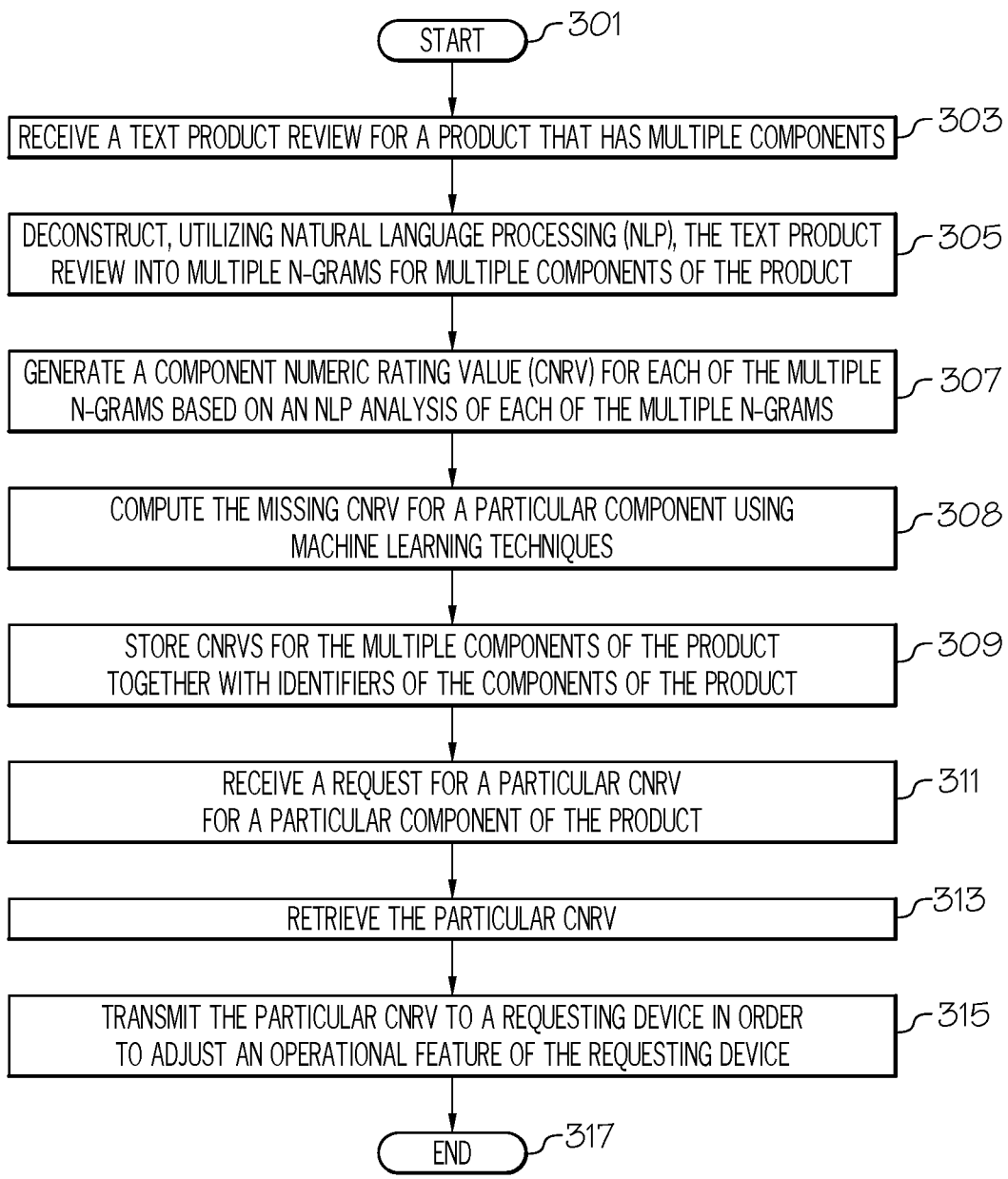
FIG. 3 is a high-level flow-chart of one or more steps performed by one or more computers and/or other hardware devices to improve the performance of a computer and/or other devices by deconstructing text product reviews into quantified product component ratings.

With reference now to FIG. 3, a high-level flow-chart of one or more steps performed by one or more computers and/or other hardware devices to improve the performance of a computer and/or other device(s) by deconstructing text product reviews into quantified product component ratings is presented.

After initiator block 301, one or more processors (e.g., processor 103 shown in FIG. 1) receive (e.g., from the product review server 153 shown in FIG. 1) a first text product review for a first product, as described in block 303. The first product (e.g., a smart phone) has multiple components, such as a camera display, and a battery, as described in the example shown in FIG. 2.

As described in block 305, the processor(s) deconstruct, by utilizing natural language processing (NLP), the first text product review into multiple n-grams, where each of the multiple n-grams is a sequence of words from the first text product review, and where each of the multiple n-grams is a review of a particular component from the multiple components of the first product. That is, by recognizing various verbs, nouns, conjunctions, syntax, etc. in the text product review, NLP will identify multiple strings of words used by a reviewer to rate various components of the product.

As described in block 307, the processor(s) then generate a component numeric rating value (CNRV) for each of the multiple n-grams, where the CNRV is based on an NLP analysis of each of the multiple n-grams. For example and as described in FIG. 2, NLP will assign a rating of 5 to the camera, 4 to the display, and 4 to the battery of a phone reviewed in review 202 based on the text review "excellent camera, nice display, good battery".

As described in block 308, the processor(s) generate the component numeric rating value (CNRV) for the missing n-gram for the product component by using machine learning techniques such as collaborative filtering. For example, in one or more embodiments of the present invention, the processor(s) determine that the second text product review (e.g. review 204a shown in FIG. 2) is missing the value for a certain component (e.g., the display) of the second product, and uses machine learning statistical methods to generate the rating value.

As described in block 309, the processor(s) then store (e.g., in hard drive 133 shown in FIG. 1) CNRVs for the multiple components of the first product, where each of the CNRVs are stored together with an identifier of a particular component of the first product. That is, a tag or other identifier will identify each component that is associated with a certain rating. For example, a phone may have an overall tag of "P", its camera rating of 5 (from rating 202) may be tagged with "C", the display rating of 4 may be tagged with "D", and the battery rating of 4 may be tagged with "B", in order to afford rapid retrieval of the various components' numeric ratings.

As described in block 311, the processors(s) subsequently receive a request (e.g., from the requesting device 151 shown in FIG. 1) for a particular CNRV for the particular component of the first product (e.g., the requesting device 151 is requesting CNRVs for one or more components of the first product).

As described in block 313, the processor(s) retrieve the particular CNRV for the component being requested, and then transmit the particular CNRV to a requesting device of the request in order to adjust an operational feature of the requesting device (block 315).

The flow-chart ends at terminator block 317.

The requesting device can be adjusted according to what the requesting device does.

For example and in one embodiment of the present invention, assume that the requesting device 151 shown in FIG. 1 is a webpage server that serves a product review webpage for the first product. In this embodiment, the processor(s) from computer 101 cause the transmission of the particular CNRV to the webpage server, and direct the webpage server to modify the product review webpage by displaying the particular CNRV for the particular component of the first product. For example, assume that a webpage shows an overall product review of 5 for a camera. However, a user may be interested in certain component reviews.

Figure 4:
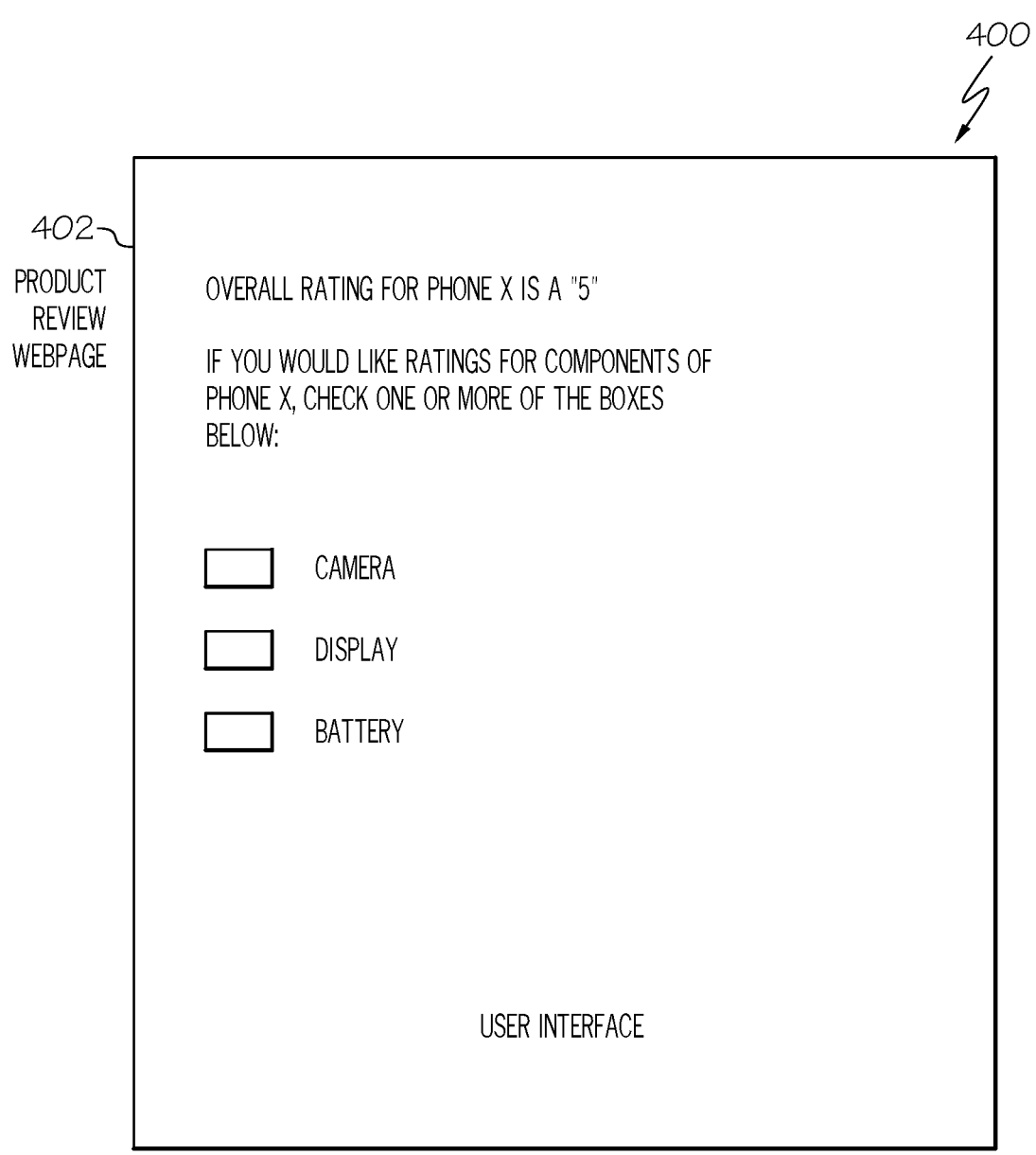
FIG. 4 depicts a user interface on a user computer for selecting product component ratings.

For example, consider user interface 400 shown in FIG. 4, which is displayed on the user computer 155 shown in FIG. 1. As depicted in FIG. 4, the user is invited to select one or more components (camera, display, battery) of Phone X, for which a composite numeric review (e.g., from the aggregated scores shown in row 212 in table 200b in FIG. 2) will be displayed on a product review webpage 402 served by the product review server 153 shown in FIG. 1. In response to selecting one or more of the components, the product review webpage 402 will change in appearance to display the aggregate score rating for the selected component of the phone.

In an embodiment of the present invention, requesting device 151 shown in FIG. 1 is a manufacturing device (e.g., a computer controlled device such as a computer numerical control—CNC lathe, a robot, etc.) that constructs the first product. In this embodiment, the processor(s) identify a deficient component of the first product, where the deficient component has a deficiency, where the deficiency is described in a deficient component n-gram from the first text product review, and where the deficient component n-gram has a CNRV whose value is below a predetermined value. For example, assume that the manufacturing device is assembling the phone discussed in FIG. 2. Assume further that the aggregated score for the battery in the phone is only 3, which is below a predetermined value of 3.5 As such, the processor(s) identify the cause of the deficiency in the deficient component (battery) as being undersized (i.e., does not hold enough power to meet the needs of the user). The processor(s) then identify a replacement component (e.g., a higher-rated battery) that does not cause the deficiency in the deficient component, and then direct the manufacturing device to replace the deficient component (the low storage battery) with the replacement component (the high storage battery).

Identifying this replacement component can be achieved by examining other products. For example, assume that the processor(s) receive a CNRV for each of multiple components of a second product, where the first product and the second product are of a same product type. That is, assume that the first product and the second product are both phones. The processor(s) then identify a non-defective component (e.g. the high storage battery) in the second product that performs a same type of function as the defective component in the first product. The processor(s) then identify the non-defective component in the second product as the replacement component to be used by the manufacturing device as a replacement for the deficient component of the first product.

The approach just described for replacing a battery in a phone may be used in other embodiments as well. For example, assume that a software product has a component that consistently receives low scores from users. However, a similar software product has an analogous component that receives high scores from users. Assuming that the software developer has the right to use this analogous component, the system will modify the first software program by replacing the poor component (e.g., operating system, application program interface, etc.) with the better component (e.g., an upgraded operating system, an improved application program interface, etc.). Thus, in an embodiment of the present invention, the first product is a computer system, and the deficient component and the replacement component are software components of the computer system.

As described herein, in an embodiment of the present invention the first product is a physical product, the requesting device is a robotic device that constructs the physical product, and the one or more processors direct the robotic device to replace the deficient component in the physical product with the replacement component.

In an embodiment of the present invention and as described in FIG. 2, the processor(s) receive a second text product review for a second product, where the second product is a same type of product as the first product (e.g., both products are phones). The processor(s) determine that the second text product review (e.g. review 204a shown in FIG. 2) is missing an n-gram for a certain component (e.g., the display) of the second product, where a copy of the certain component is also in the first product, and where a certain CNRV has been generated (e.g., "4") for the copy of the certain component in the first product. As described in FIG. 2, the processor(s) then assign the CNRV ("4") that has been generated for the copy of the certain component in the first product to a CNRV for the certain component in the second product.

In an embodiment of the present invention, the processor(s) generate an aggregated CNRV for multiple CNRVs (shown for example in row 212 in FIG. 2), where the multiple CNRVs are derived from multiple text product reviews for the first product.

The present invention may be implemented in one or more embodiments using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
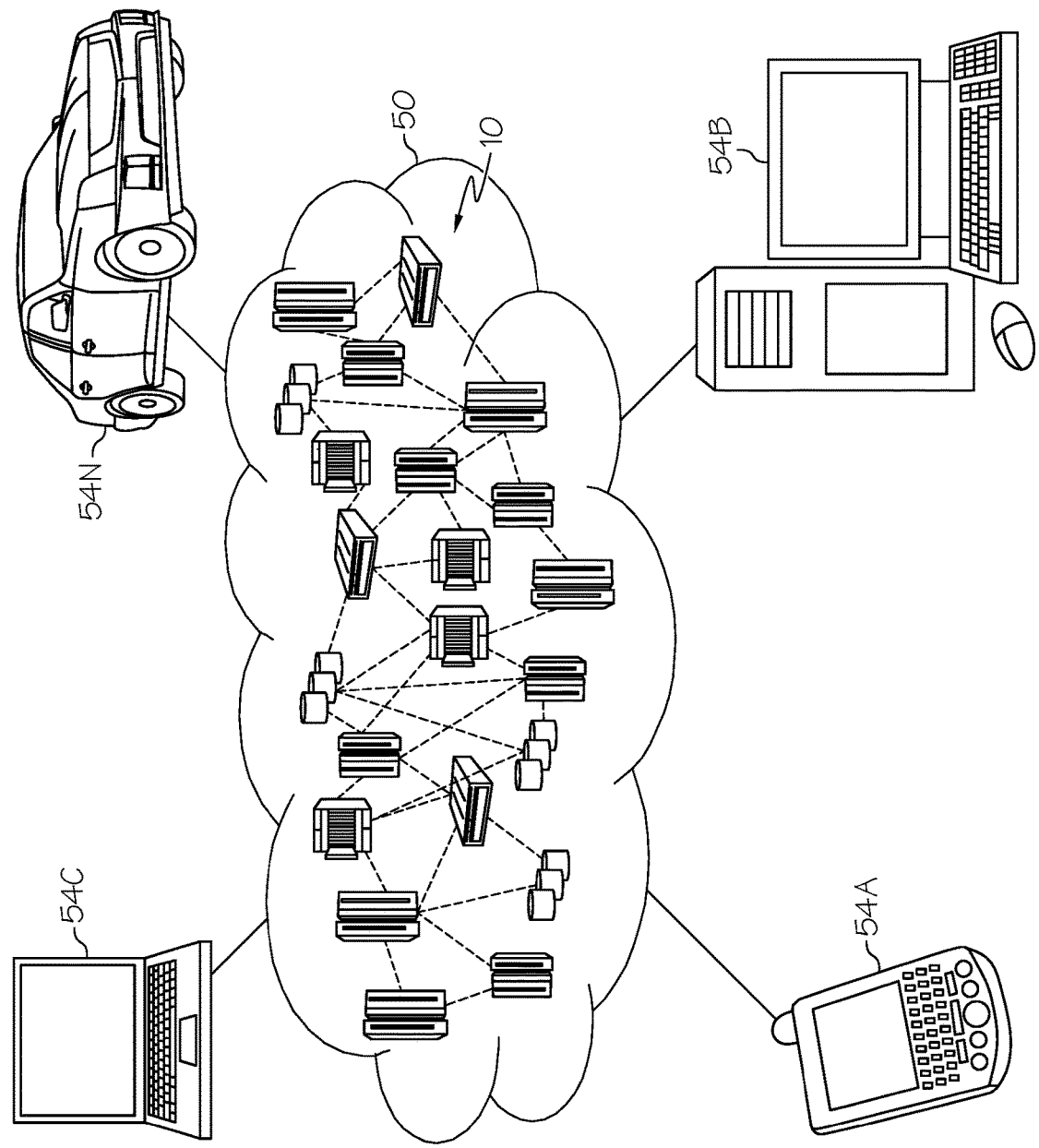
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 5 are intended to be illustrative only and that computing nodes 10 and cloud computing environment 50 can communicate with any type of computerized device over any type of network and/or network addressable connection (e.g., using a web browser).

Figure 6:
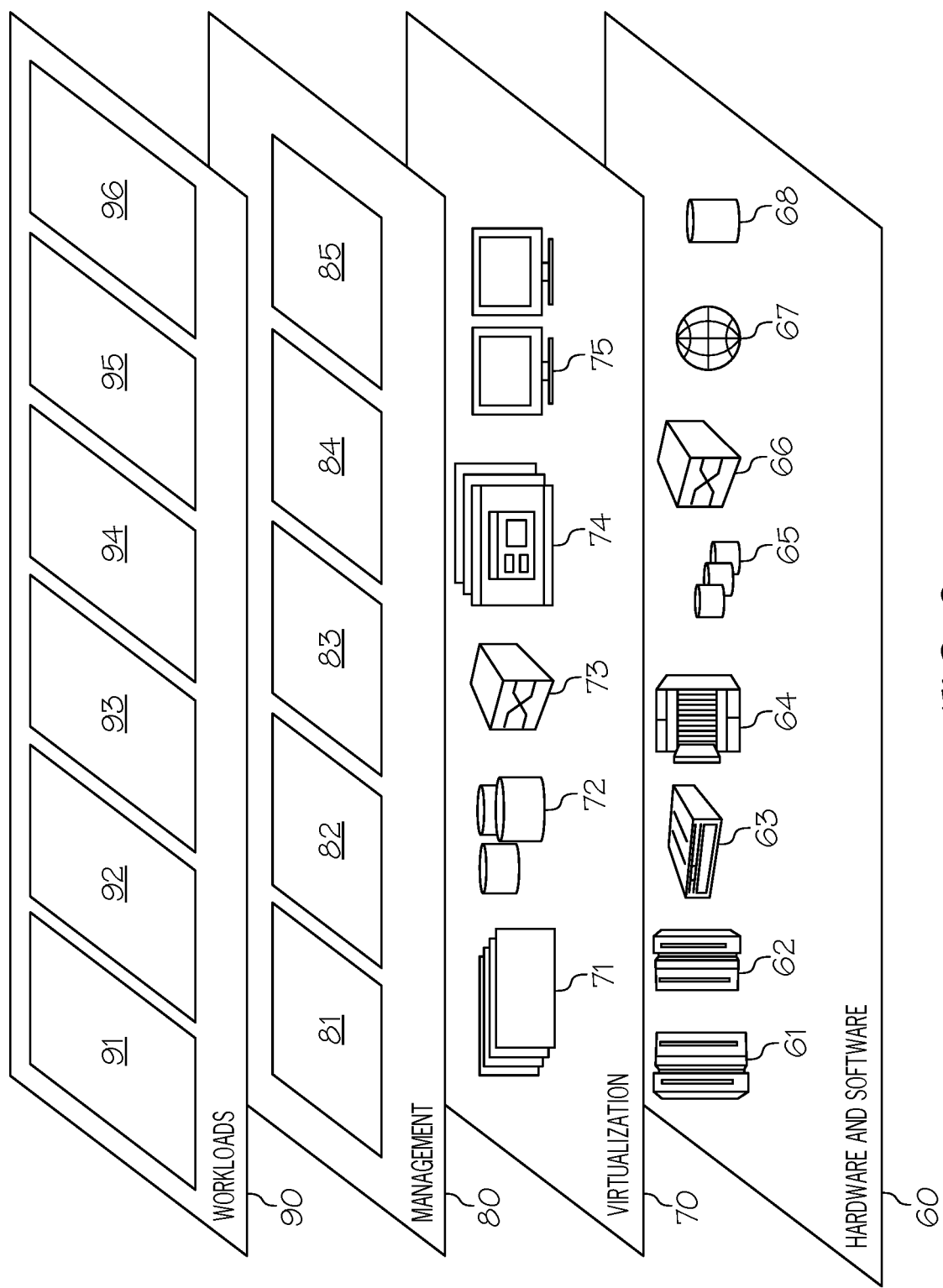
FIG. 6 depicts abstraction model layers of a cloud computing environment according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and product review text processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:
   deconstructing, by one or more processors, a first text product review into multiple n-grams, wherein each of the multiple n-grams is a review of a particular component from components of a first product;
   generating, by one or more processors, a component numeric rating value (CNRV) for each of the multiple n-grams, wherein the CNRV is based on an analysis of each of the multiple n-grams;

identifying, by one or more processors, a deficient component of the first product, wherein the deficient component has a deficiency, wherein the deficiency is described in a deficient component n-gram from the first text product review, and wherein the deficient component n-gram has a CNRV whose value is below a predetermined value;

identifying, by one or more processors, a cause of the deficiency in the deficient component;

identifying, by one or more processors, a replacement component that does not cause the deficiency in the deficient component; and directing, by one or more processors, a manufacturing device that manufactures the first product to replace the deficient component with the replacement component.

2. The method of claim 1, further comprising:

receiving, by one or more processors, a CNRV for each of multiple components of a second product, wherein the first product and the second product are of a same product type;

identifying, by one or more processors, a non-defective component in the second product that performs a same type of function as the defective component in the first product; and identifying, by one or more processors, the non-defective component in the second product as the replacement component to be used by the manufacturing device as a replacement for the deficient component of the first product.

3. The method of claim 1, wherein the first product is a computer system, and wherein the deficient component and the replacement component are software components of the computer system.

4. The method of claim 1, wherein the manufacturing device is a robotic device that constructs the first product, and wherein the one or more processors direct the robotic device to replace the deficient component in the first product with the replacement component.

5. The method of claim 1, further comprising:

receiving, by one or more processors, a second text product review for a second product, wherein the second product is a same type of product as the first product;

determining, by one or more processors, that the second text product review is missing an n-gram for a certain component of the second product, wherein a copy of the certain component is also in the first product, and wherein a certain CNRV has been generated for the copy of the certain component in the first product; and assigning, by one or more processors, the CNRV that has been generated for the copy of the certain component in the first product to a CNRV for the certain component in the second product.

6. The method of claim 1, further comprising:

generating, by one or more processors, an aggregated CNRV for multiple CNRVs, wherein the multiple CNRVs are derived from multiple text product reviews for the first product.

7. The method of claim 1, wherein the method is implemented as a cloud-based service.

8. A computer program product comprising one or more computer readable storage mediums, and program instructions stored on at least one of the one or more computer readable storage mediums, the stored program instructions comprising:

program instructions to deconstruct a first text product review into multiple n-grams, wherein each of the multiple n-grams is a review of a particular component from components of a first product;

program instructions to generate a component numeric rating value (CNRV) for each of the multiple n-grams, wherein the CNRV is based on an analysis of each of the multiple n-grams;

program instructions to identify a deficient component of the first product, wherein the deficient component has a deficiency, wherein the deficiency is described in a deficient component n-gram from the first text product review, and wherein the deficient component n-gram has a CNRV whose value is below a predetermined value;

program instructions to identify a cause of the deficiency in the deficient component;

program instructions to identify a replacement component that does not cause the deficiency in the deficient component; and program instructions to direct a manufacturing device that manufactures the first product to replace the deficient component with the replacement component.

9. The computer program product of claim 8, further comprising:

program instructions to receive a CNRV for each of multiple components of a second product, wherein the first product and the second product are of a same product type;

program instructions to identify a non-defective component in the second product that performs a same type of function as the defective component in the first product; and program instructions to identify the non-defective component in the second product as the replacement component to be used by the manufacturing device as a replacement for the deficient component of the first product.

10. The computer program product of claim 8, wherein the first product is a computer system, and wherein the deficient component and the replacement component are software components of the computer system.

11. The computer program product of claim 8, wherein the manufacturing device is a robotic device that constructs the first product, and wherein the one or more processors direct the robotic device to replace the deficient component in the first product with the replacement component.

12. The computer program product of claim 8, further comprising:

program instructions to receive a second text product review for a second product, wherein the second product is a same type of product as the first product;

program instructions to determine that the second text product review is missing an n-gram for a certain component of the second product, wherein a copy of the certain component is also in the first product, and wherein a certain CNRV has been generated for the copy of the certain component in the first product; and program instructions to assign the CNRV that has been generated for the copy of the certain component in the first product to a CNRV for the certain component in the second product.

13. The computer program product of claim 8, further comprising:
   program instructions to generate an aggregated CNRV for multiple CNRVs, wherein the multiple CNRVs are derived from multiple text product reviews for the first product.

14. The computer program product of claim 8, wherein the program instructions are provided as a service in a cloud environment.

15. A computer system comprising one or more processors, one or more computer readable memories, and one or more computer readable storage mediums, and program instructions stored on at least one of the one or more computer readable storage mediums for execution by at least one of the one or more processors via at least one of the one or more computer readable memories, the stored program instructions comprising:
   program instructions to deconstruct a first text product review into multiple n-grams, wherein each of the multiple n-grams is a review of a particular component from components of a first product;
   program instructions to generate a component numeric rating value (CNRV) for each of the multiple n-grams, wherein the CNRV is based on an analysis of each of the multiple n-grams;
   program instructions to identify a deficient component of the first product, wherein the deficient component has a deficiency, wherein the deficiency is described in a deficient component n-gram from the first text product review, and wherein the deficient component n-gram has a CNRV whose value is below a predetermined value;
   program instructions to identify a cause of the deficiency in the deficient component;
   program instructions to identify a replacement component that does not cause the deficiency in the deficient component; and
   program instructions to direct a manufacturing device that manufactures the first product to replace the deficient component with the replacement component.

16. The computer system of claim 15, further comprising:
   program instructions to receive a CNRV for each of multiple components of a second product, wherein the first product and the second product are of a same product type;
   program instructions to identify a non-defective component in the second product that performs a same type of function as the defective component in the first product; and
   program instructions to identify the non-defective component in the second product as the replacement component to be used by the manufacturing device as a replacement for the deficient component of the first product.

17. The computer system of claim 15, wherein the first product is a computer system, and wherein the deficient component and the replacement component are software components of the computer system.

18. The computer system of claim 15, wherein the manufacturing device is a robotic device that constructs the first product, and wherein the one or more processors direct the robotic device to replace the deficient component in the first product with the replacement component.

19. The computer system of claim 15, further comprising:
   program instructions to receive a second text product review for a second product, wherein the second product is a same type of product as the first product;
   program instructions to determine that the second text product review is missing an n-gram for a certain component of the second product, wherein a copy of the certain component is also in the first product, and wherein a certain CNRV has been generated for the copy of the certain component in the first product; and
   program instructions to assign the CNRV that has been generated for the copy of the certain component in the first product to a CNRV for the certain component in the second product.

20. The computer system of claim 15, further comprising:
   program instructions to generate an aggregated CNRV for multiple CNRVs, wherein the multiple CNRVs are derived from multiple text product reviews for the first product.

* * * * *